United States Patent [19]
Ishigami et al.

[11] Patent Number: 5,706,030
[45] Date of Patent: Jan. 6, 1998

[54] COMPACT DATA INPUT DEVICE HAVING TRANSPARENT TOUCH PANEL

[75] Inventors: Michifumi Ishigami, Nagoya; Mitsumasa Kako, Toukai; Yoshijiro Yamamoto, Toyokawa, all of Japan

[73] Assignee: Brother Kogyo Kabushiki Kaisha, Aichi-ken, Japan

[21] Appl. No.: 459,813

[22] Filed: Jun. 2, 1995

[30] Foreign Application Priority Data

Jun. 2, 1994 [JP] Japan .................. 6-145420

[51] Int. Cl.$^6$ .................................. G09G 5/00
[52] U.S. Cl. .......................... 345/168; 345/173
[58] Field of Search .................. 345/173, 174, 345/175, 176, 179, 180, 182, 168, 87, 901, 903, 904, 905; 341/22, 23; 178/18, 19; 364/708.1, 709.1, 709.11, 709.12, 709.13

[56] References Cited

U.S. PATENT DOCUMENTS

| | | | |
|---|---|---|---|
| 4,862,497 | 8/1989 | Seto et al. | 379/355 |
| 4,890,832 | 1/1990 | Komaki | 341/23 |
| 4,899,137 | 2/1990 | Behrens et al. | 345/173 |
| 4,926,010 | 5/1990 | Citron | 345/168 |
| 5,188,469 | 2/1993 | Nagao et al. | |
| 5,250,929 | 10/1993 | Hoffman et al. | 345/173 |
| 5,353,016 | 10/1994 | Kurita et al. | 341/23 |
| 5,542,770 | 8/1996 | Lin | 341/23 |
| 5,579,034 | 11/1996 | Aoyama et al. | 345/168 |

FOREIGN PATENT DOCUMENTS

| | | |
|---|---|---|
| 588815 | 4/1993 | Japan. |
| 5120233 | 5/1993 | Japan. |

*Primary Examiner*—Xiao Wu
*Attorney, Agent, or Firm*—Kane,Dalsimer, Sullivan,Kurucz,Levy,Eisele and Richard, LLP

[57] ABSTRACT

Disclosed is the tape printer 1 constructed from the main body 2 shaped nearly a rectangular parallelpiped having a front face slightly inclined rearward and the input part 3 shaped like as a flat plate which is extended from a front bottom of the main body 2. On the front face of the main body 2, the liquid crystal display 5 is arranged. In the input part 3, the plate 7, on which the keyboard pattern is printed, is movably arranged under the transparent touch panel 10. The position of the plate 7 is detected based on combinations of ON state and OFF state of the first position sensor 131 and the second position sensor 132. When it is detected by the sensors 131,132 that the plate 7 is positioned under the transparent touch panel 10, the character data is input by using the positional data output from the transparent touch panel 10 through the input pen 6. When it is detected by the sensors 131, 132 that the plate is positioned substantially out of the transparent touch panel 10, the figure data is input by using the positional data output from the transparent touch panel 10 through the input pen 6.

21 Claims, 11 Drawing Sheets

FIG. 4 (B)

| S1 | POWER ON |
|---|---|
| S2 | INITIALIZATION |
| S3 | PLATE POSITION IS CHANGED? |
| S4 | PLATE IS SLID TO KEYBOARD INPUT POSITION? |
| S5 | SCREEN FOR KEYBOARD INPUT MODE IS DISPLAYED |
| S6 | PLATE IS SLID TO POSITION OF FIGURE INPUT MODE? |
| S7 | SCREEN FOR FIGURE INPUT MODE IS DISPLAYED |
| S8 | MESSAGE "PLATE POSITION IS INCORRECT" IS DISPLAYED |
| S9 | PLATE POSITION IS CORRECT? |
| S10 | DATA INPUT IS CONDUCTED BY INPUT PEN? |
| S11 | COMMON COMMAND INPUT? |
| S12 | COMMAND PROCESS IS EXECUTED |
| S13 | PLATE IS POSITIONED AT KEYBOARD INPUT POSITION? |
| S14 | CHARACTER OR FUNCTION IS SELECTED |
| S15 | CHARACTER IS DISPLAYED |
| S16 | CHARACTER IS STORED |
| S17 | PLATE IS POSITIONED AT FIGURE INPUT POSITION? |
| S18 | FIGURE DATA OR FIGURE TOOL COMMAND DATA IS EXECUTED |
| S19 | FIGURE IS STORED |
| S20 | FIGURE IS DISPLAYED |

FIG. 9

COMPACT DATA INPUT DEVICE HAVING TRANSPARENT TOUCH PANEL

BACKGROUND OF THE INVENTION

1. Field of the Invention

The present invention relates to a compact data input device for inputting various data, which is utilizable for printer, electronic notebook ect., and in particular, relates to a compact data input device having a transparent touch panel, through which character data and various figure data can be input by pressing on the transparent touch panel through an input pen.

2. Description of Related Art

Conventionally, in electronic device with data input function such as a printer, an electronic notebook and a similar device, inputting of character data is done by using a keyboard with many keybuttons which are depressed when character data is input. Recently, there is proposed an electronic device having a transparent touch panel and an input pen in addition to a keyboard or instead thereof. In such an electronic device, the touch panel has a function to output coordinate data corresponding to depressed points when depressed through the input pen thereon, thereby character and figure data can be input by handwriting through the input pen depressing on the touch panel.

In the above pen-touch type electronic device, a conventional keyboard is, in general, independently utilized therewith. In case that characters are normally input, the keyboard is utilized. On the other hand, in case that handwriting input is conducted, the touch panel and the input pen are used. In this way, the keyboard and the touch panel are properly used according to kinds of data to be input. Further, the data input through the keyboard and/or the touch panel is also compiled on a display or when output on a print medium.

However, when the above input manner of character and figure data is taken in an electronic device with small size such as a tape printer, there exist some problems as follows.

First, the keyboard having a normal size, which is used in a desktop personal computer, cannot be adopted because there is a remarkable difference between the sizes of the keyboard and the device. Thus, it is necessary to use a keyboard having a comparatively small size in accordance with the size of the electronic device. As a result, it is very inconvenient to input characters since keybuttons on the keyboard are very small.

Second, in the above electronic device, the keyboard cannot be used while the touch panel is used and contrarily, the touch panel cannot be used while the keyboard is used. Further, it is in general that change between the keyboard and the touch panel is very troublesome. Therefore, it is hard to use properly the keyboard and the touch panel in correspondence to purpose of data input.

Third, the above device leads to have two units comprising a main body thereof and the keyboard, thus it is very inconvenient to use the device. Further, if the touch panel is divided as an independent unit from the main body, it is still inconvenient.

SUMMARY OF THE INVENTION

To dissolve the above problems, it is an object of the present invention to provide a compact data input device having a pen-touch device comprised from an input pen and a transparent touch panel which has a keyboard pattern plate enabling to input characters, thereby it can become unnecessary an independent keyboard by giving a keyboard function to the pen-touch device and it can become easy to rapidly change input manner between key input and handwriting input.

In order to accomplish the object, the present invention provides a compact data input device having a transparent touch panel outputting positional data in accordance with a position depressed by an input pen and a plurality of data change programs including at least a figure input program and a keyboard input program, the positional data output from the transparent touch panel being changed into character data or figure data based on the data change programs, the data input device comprising:

an input plate with keyboard pattern thereon, the input plate being movably arranged under the transparent touch panel;

detection means for detecting a first position where the input plate is positioned under the transparent touch panel and a second position where the input plate is positioned substantially out of the transparent touch panel; and selection means for selecting one of the data change programs based on the first position or the second position detected by the detection means;

wherein the selection means selects the keyboard input program when the first position is detected by the detection means and selects the figure input program when the second position is detected by the detection means.

In the above compact data input device of the present invention, when the input plate is moved under the transparent touch panel, the detection means detects one of the first position and the second position. Here, if the detection means detects the first position, the input plate is positioned under the transparent touch panel and if the detection means detects the second position, the input panel is positioned substantially out of the transparent touch panel.

Further, the selection means selects the keyboard input program among the data change programs in case that the first position is detected by the detection means. On the other hand, the selection means selects the figure input program among the data change programs in case that the second position is detected by the detection means.

Therefore, in case that the input plate is moved to the first position, the positional data output from the transparent touch panel in accordance with the depressed position by the input pen is changed into the character data under control by the keyboard input program. Contrarily, in case that the input plate is moved to the second position, the positional data output from the transparent touch panel in accordance with the depressed position by the input pen is changed into the figure data under control by the figure input program.

Accordingly, it can provide the compact data input device through which both the character data and the figure data can be input based on the positional data input from the common transparent touch panel since the input plate with the keyboard pattern is arranged under the transparent touch panel so as to be able to move between the first position and the second position. Thereby, it can become unnecessary to assemble an independent keyboard, as a result, cost of the data input device can be reduced. Further, the data input manner can be easily change only by moving the input plate.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

3

BRIEF DESCRIPTION OF THE DRAWINGS

The present invention will be described with reference to the accompanying drawings wherein.

FIG. 9 is a plan view of the keyboard plate; and

DETAILED DESCRIPTION OF THE PREFERRED EMBODIMENTS

Figure 1:
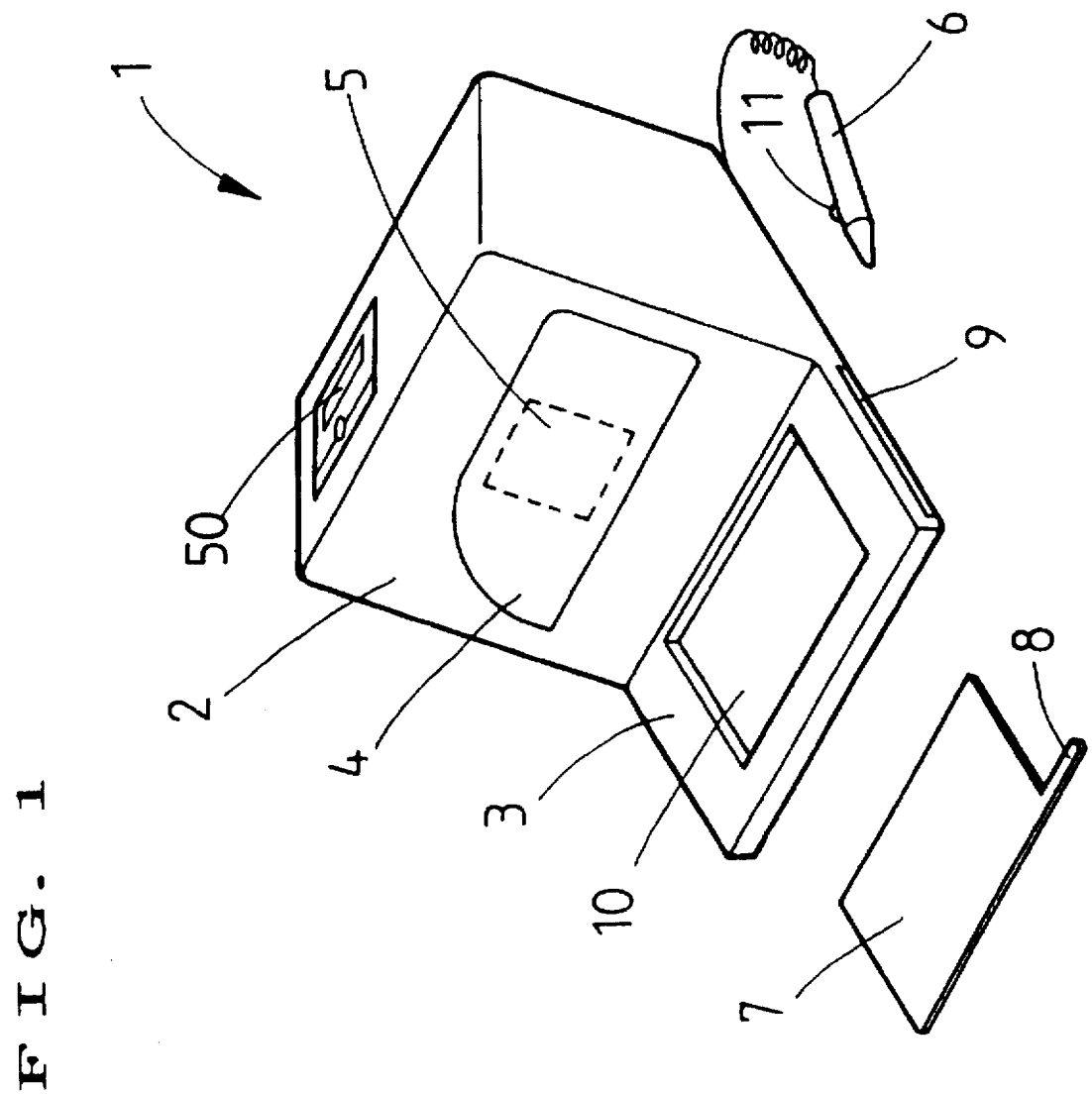
FIG. 1 is a schematic perspective view showing a tape printer according to the embodiment of the present invention.

It will be given a detailed description of the preferred embodiment of the present invention with reference to the accompanying drawings. In FIG. 1, a tape printer 1 is basically constructed from; a main body 2 shaped nearly a rectangular parallelepiped having a front face slightly inclined rearward; and an input part 3 shaped like as a flat plate which extended from a front bottom of the main body 2. On the front face of the main body 2, it is formed a display part 4 in the center of which a liquid crystal display 5 is arranged. The liquid crystal display 5 is used for displaying data input from the input part 3. An input pen 6 used for processing input data from the input part 3 is connected to the main body 2 of the tape printer 1. On the side surface of the input pen 6, a pen switch 11 for directing various decisions about the data input from the input part 3 is arranged.

Figure 2:
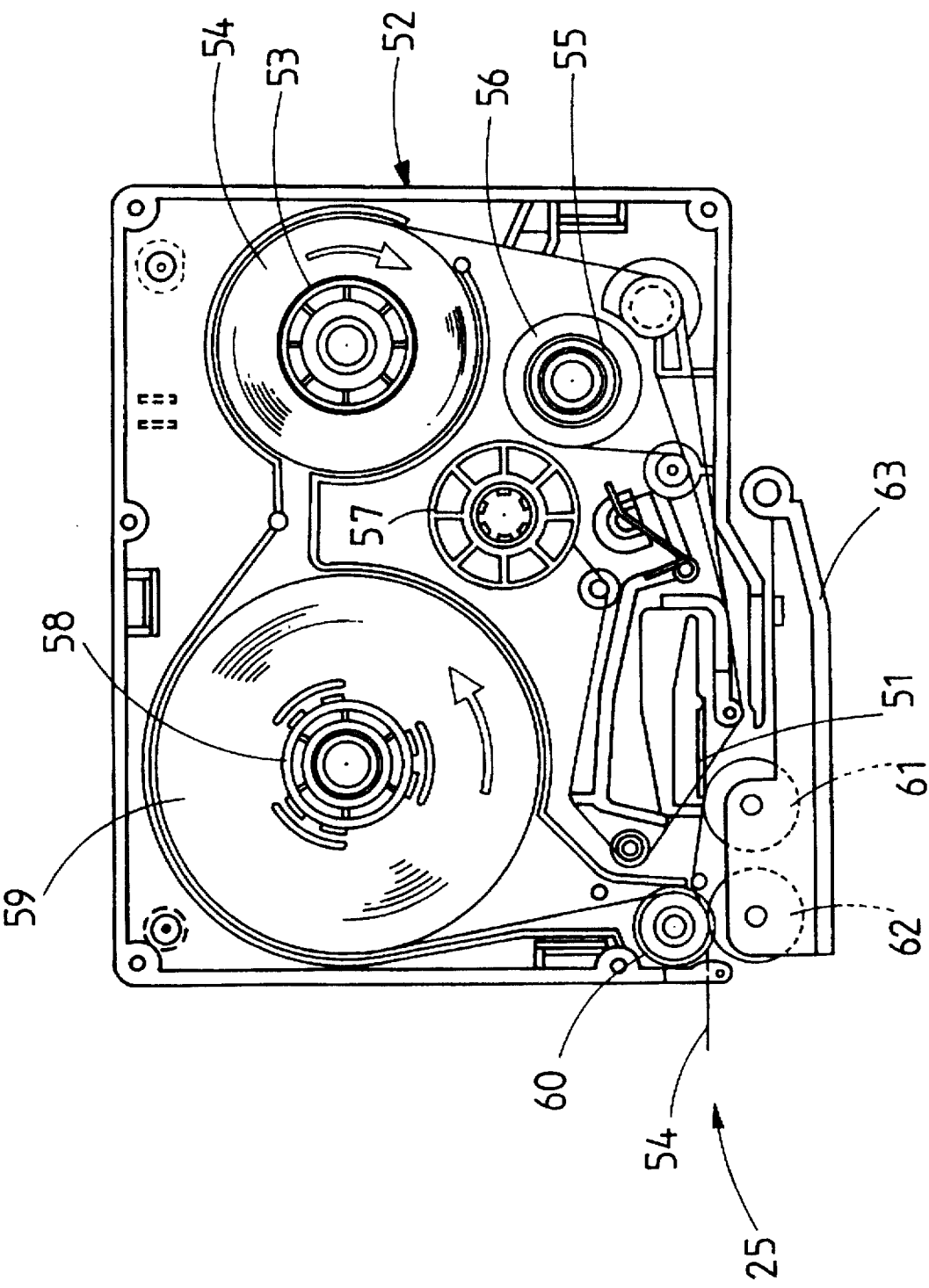
FIG. 2A is a plan view of a tape cassette accommodating part in which both a print mechanism and a tape cassette are arranged and FIG. 2B is a control block diagram showing a control system of the tape printer.

On the top face of the main body 2, it is arranged a tape cassette accommodating part 50 in which a thermal head 51 used in a print mechanism 25 (see FIG. 2B) and a tape cassette 52 are installed. Here, the print mechanism 25 and the tape cassette 52 will be explained hereinafter with reference to FIG. 2A. The print mechanism 25 includes a rectangular tape cassette 52 detachably loaded thereto. The tape cassette 51 includes a tape spool 53 around which a tape 54 having a width of about 24 mm and formed of a transparent film is wound; a ribbon supply spool 55 around which an ink ribbon 56 is wound; a winding spool 57 for winding the ink ribbon 56; a supply spool 58 around which a double-sided adhesive tape 59 having the same width as that of the tape 54 is wound with the releasable paper provided facing the outside; and an adhere roller 60 for adhering the print tape 54 with the double-sided adhesive tape 59. These spool and roller are rotatably mounted to the tape cassette 52.

4

The thermal head 51 is vertically disposed at the position where the print tape 54 is placed on the ink ribbon 56. A platen roller 61 for pressing the print tape 54 and ink ribbon 56 against the thermal head 51, and a feed roller 62 for pressing the print tape 54 and double-sided adhesive tape 59 against the adhere roller 60 are rotatably supported by a support member 63. The thermal head 51 includes a heating element group composed of 128 heating elements aligned in the width direction of the tape 54 thereon.

Therefore, when the heating element group is energized while the adhere roller 60 and winding spool 57 are driven in a predetermined rotational direction synchronously with each other in accordance with the rotation of a tape feed roller (not shown) in a predetermined rotational direction, characters/symbols or figures are printed onto the tape 54. Moreover, the tape 54 is fed in a tape feed direction A while being adhered with the double-sided adhesive tape 59. With respect to the detail of the print mechanism 25, refer to U.S. Pat. No. 5,188,489.

Here, with respect to the tape cassette 52, it may be utilizable a tape cassette in which a heat-sensitive tape wound around the tape spool 53 is accommodated, in stead of the tape spool 53 around which the transparent tape 54 is wound as mentioned above, without using the above tape cassette 52 where the ink ribbon 58 and the double-sided adhesive tape 59 are utilized.

Figure 10:
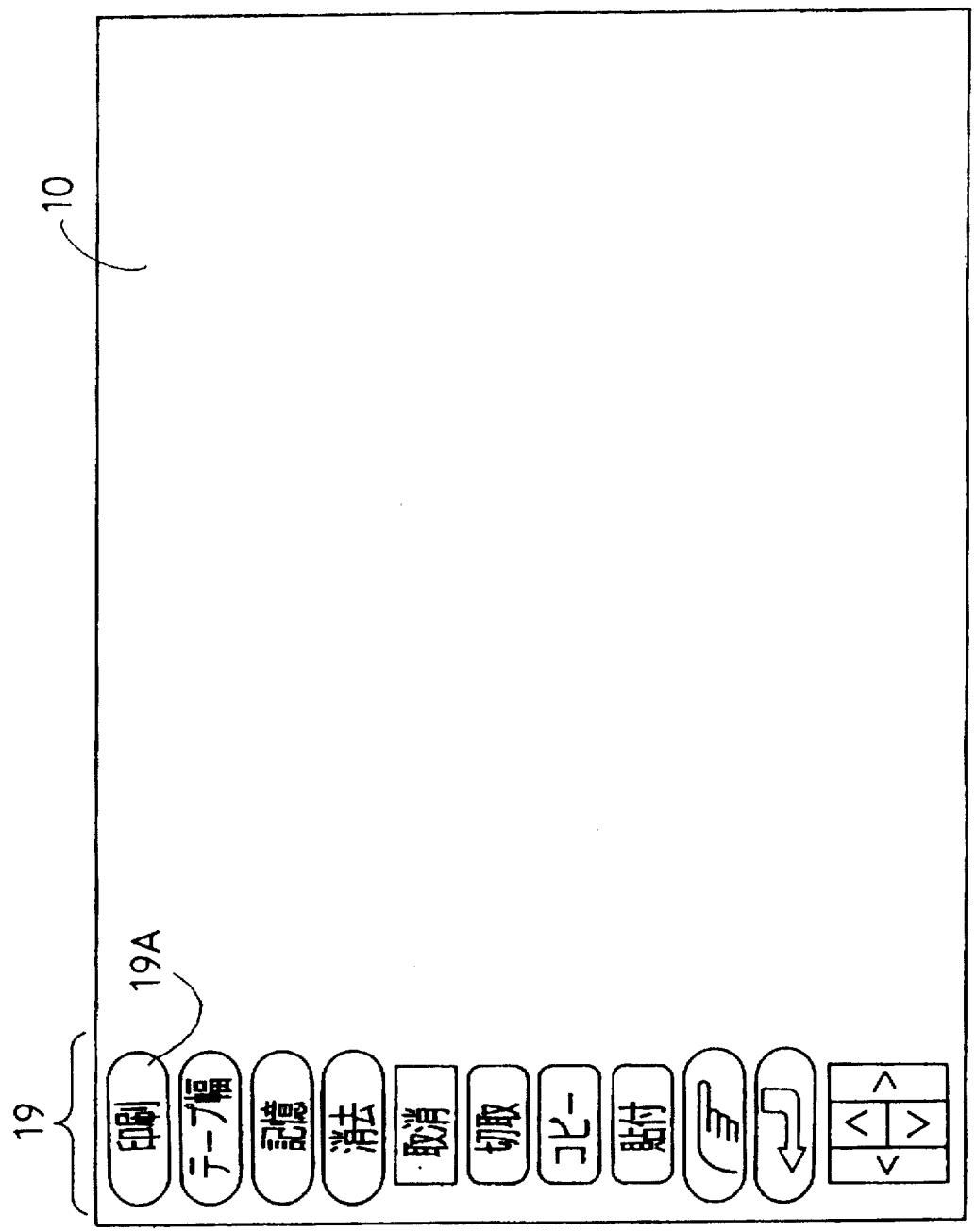
FIG. 10 is a plan view of the transparent touch panel.

On the input part 3, a transparent touch panel 10 is arranged. The transparent touch panel 10 is constructed from two transparent flexible plates and dot spacers formed therebetween, as wellknown in the prior arts. Thus, as explained hereinafter, the transparent touch panel 10 is used for inputting coordinate data to MPU 21 in accordance with positions on the touch panel 10 depressed by the input pen 6. Here, a pattern shown in FIG. 10 is printed on the transparent touch panel 10. In this pattern, a common command area 19 is printed on the left side thereof, and various common commands utilized in operation of the tape printer 1 are included in the common command area 19. For instance, a print command 19A and the other commands are formed in the common command area 19 as shown in FIG. 10.

Figure 5:
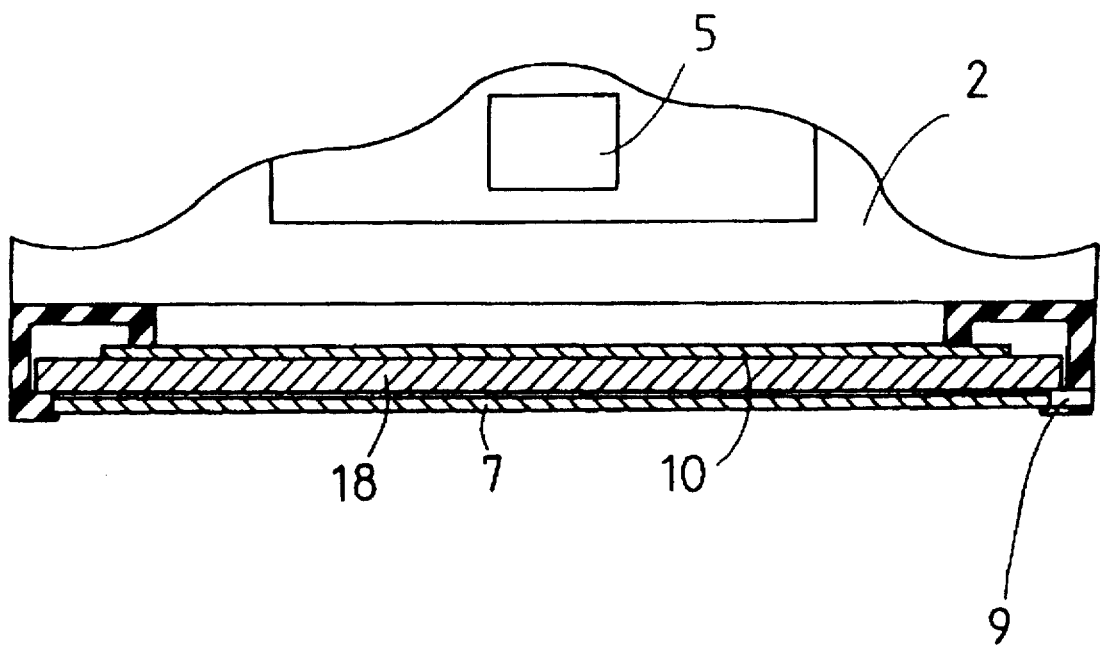
FIG. 5 is a sectional view of an input part of the tape printer.
Figure 9:
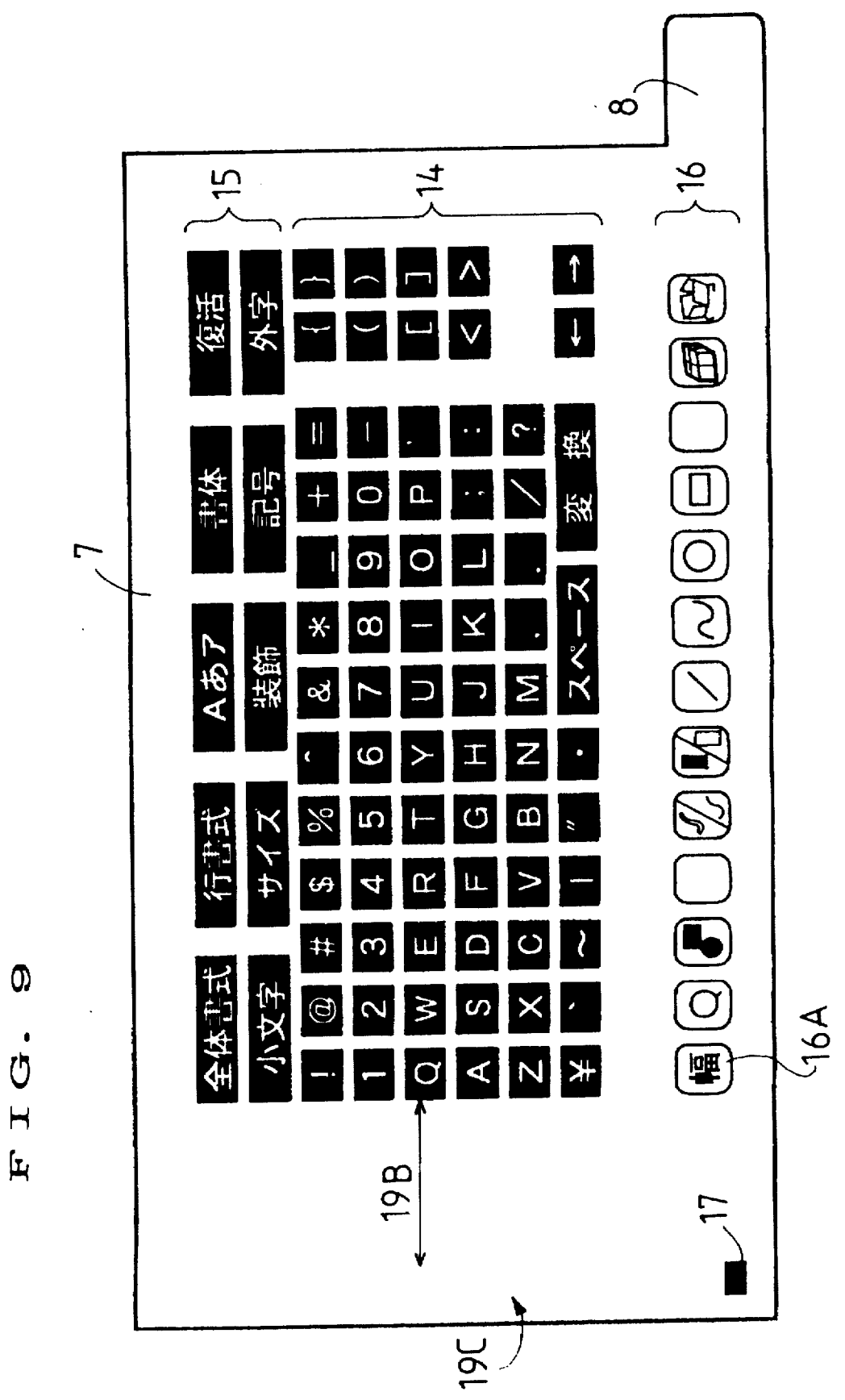

In the input part 3, it is movably arranged in forward and backward directions a plate 7 on which characters and various patterns are printed as shown in FIG. 9. The plate 7 is positioned under the transparent touch panel 10 in the input part 3, as shown in FIG. 5. At the right side of the input part 3, a slot 9 is formed to insert the plate 7 into the input part 3. The plate 7 has an operation stick 8 at the right side thereof, the operation stick 8 being used for moving the plate 7. The operation stick 8 is exposed out of the slot 9 so as to be able to externally operate the plate 7 from the input part 3. When the operation stick 8 is slid in the forward and backward directions, the plate 7 can be moved toward both the forward and backward directions in the input part 3. And a transparent plate 18 for reinforcing (protecting) the touch panel 10 is arranged between the transparent touch panel 10 and the plate 7. The plate 18 is, for example, composed of glass or the similar materials. The pattern of the common command area 19 may be printed on the plate 18, instead of the transparent touch panel 10.

Here, as one example of the plate 7, the plate 7 on which a keyboard pattern with a set of key sections is printed, similar to a normal keyboard generally used, is indicated in FIG. 9. In the plate 7 shown in FIG. 9, character and symbol key sections 14 are formed at the central position, function key sections 15 are formed at the upper position and figure tool key sections 16 are formed at the lower position. In the character and symbol key sections 14, character key patterns including alphabetical, numeral and symbolic keys are printed. In the function key sections 15, function key patterns including total format, line format, character style and the other function are printed. In the figure tool key sections 16, figure tool key patterns including line width tool key 16A and the other figure tool keys used when figures are input, are printed. Here, of course, as the plate 7, the other plate having various key sections such as Japanese or Chinese character key sections, or musical note key sections may be used according to kinds of data to be input.

At the left side of the character and symbol key sections 14, the function key sections 15 and the figure tool key sections 16, a blank section 19B is formed. The blank section 19B is formed so that it is not superposed with the common command area 19 on the transparent touch panel 10. A detection section 19C is positioned between the left end of the blank section 19B and the left end of the plate 7. A switch mark 17 is printed at the lower end of the detection section 19C (the left lower end of the plate 7). The switch mark 17 is used for detecting the position of the plate 7 by intercepting light emitted in the first position sensor 131 and the second position sensor 132 both the first position sensor 131 and the second sensor 132 are explained hereinafter). Here, the other area in the detection section 19C except for the switch mark 17 is made transparent.

Figure 7:
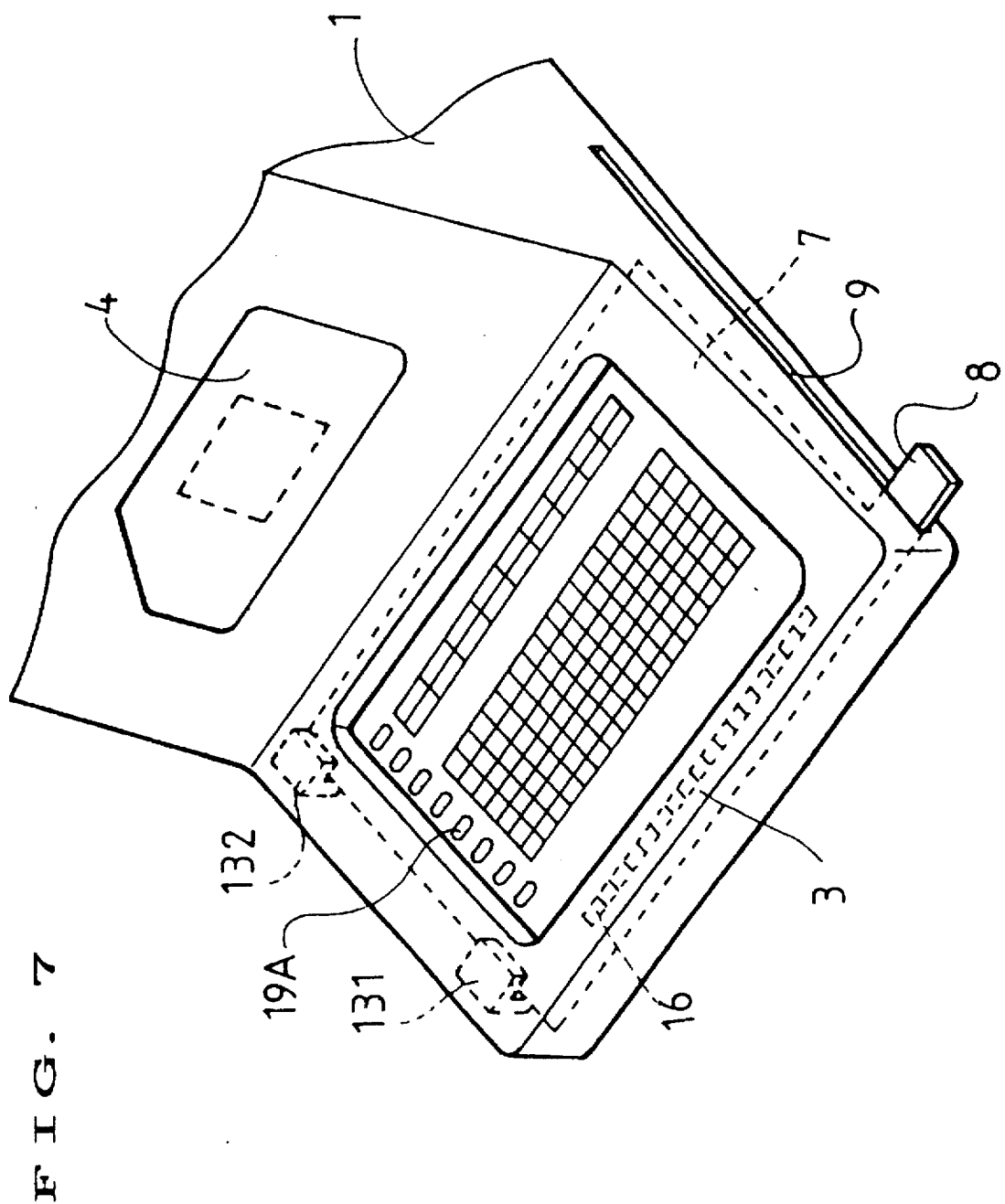
FIG. 7 is a perspective view of the input part which is set in a keyboard input mode, wherein a keyboard plate is properly set.

As shown in FIG. 7, the character and symbol key sections 14, the function key sections 15 and the figure tool key sections 16 on the plate 7 can be seen on the input part 3 through the transparent touch panel 10. And at the inner position near the left end of the input part 3, position sensors are arranged to detect the position of the plate 7 when slid to the forward and backward directions. As shown in FIG. 7, two position sensors (the first position sensor 131 and the second position sensor 132) are arranged in the tape printer 1. The first position sensor 131 is arranged at the left front position in the input part 3 and the second position sensor 132 is arranged at the left rear position therein. Both the first and the second position sensors 131, 132 are constructed from photosensors, each having a light source and a photo detector, thus each of the position sensors 131, 132 has a function to output a signal corresponding to whether the light emitted from the light source is intercepted by the switch mark 17 of the plate 7. The other type sensor with the same function may be used as the first and the second position sensors 131, 132.

Figure 6:
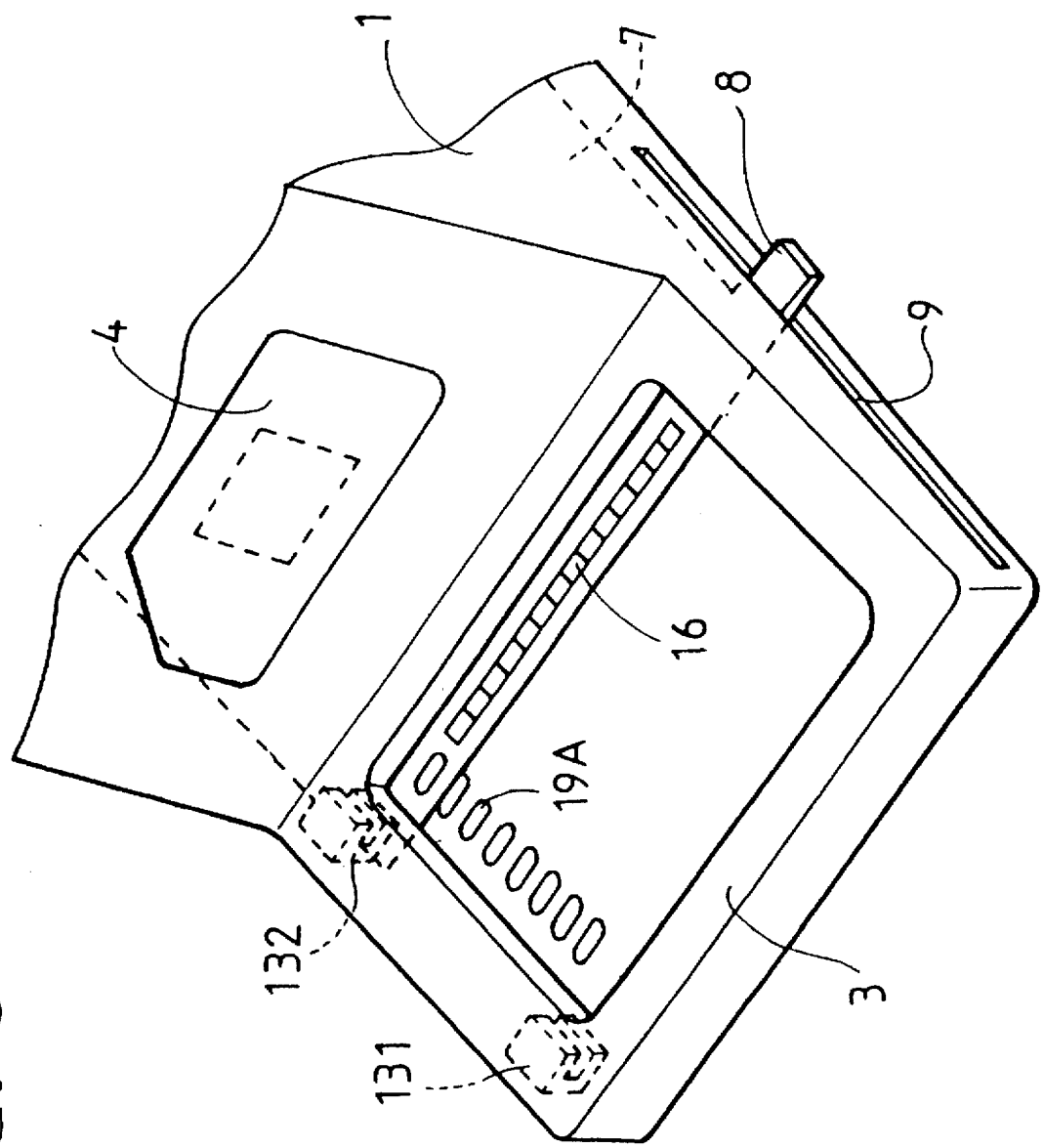
FIG. 6 is a perspective view of the input part which is set in a figure input mode, wherein a transparent touch panel is properly exposed.

Here, in case that the plate 7 is completely derived from the input part 3 to the most forward position as shown in FIG. 7, the first position sensor 131 outputs a OFF signal since the light is intercepted by the switch mark 17 and contrarily the second position sensor 132 outputs a ON signal since the light is not intercepted by the switch mark 17 based on that the detection section 19C except for the switch mark 17 is made transparent. On the other hand, in case that the plate 7 is completely slid into the main body 2 as shown in FIG. 6, the first position sensor 131 outputs the ON signal since the light is not intercepted by the switch mark 17 based on that the detection section 19C except for the switch mark 17 is made transparent and the second position sensor 132 outputs the OFF signal since the light is intercepted by the switch mark 17.

According to the position of the plate 7 detected by both the first position sensor 131 and the second position sensor 132, control system (mentioned hereinafter) selects one input mode from data change program 32 under control by select program 31. When the transparent touch panel 10 is depressed by the input pen 6, character input, figure input or the other editing process is executed corresponding to the depressed position on the touch panel 10, based on the input mode selected in the control system. Further, in the tape printer 1, a print mechanism (see FIGS. 2A and 2B), which prints on a tape the contents displayed on the liquid crystal display 5, and the other components or members necessary for the tape printer 1, are installed.

Next, construction of the control system will be described with reference to the block diagram shown in FIG. 2B. The control system of the tape printer 1 is mainly constructed from microprocessor unit (MPU) 21 with ROM 22 and RAM 23. The MPU 21 conducts various data processing and calculation necessary for controlling the tape printer 1. The ROM 21 is a read-only memory device for storing various programs and data which are necessary for the MPU 21 to conduct processing and calculation. The RAM 23 temporarily stores the data calculated by the MPU 21.

Figure 3:
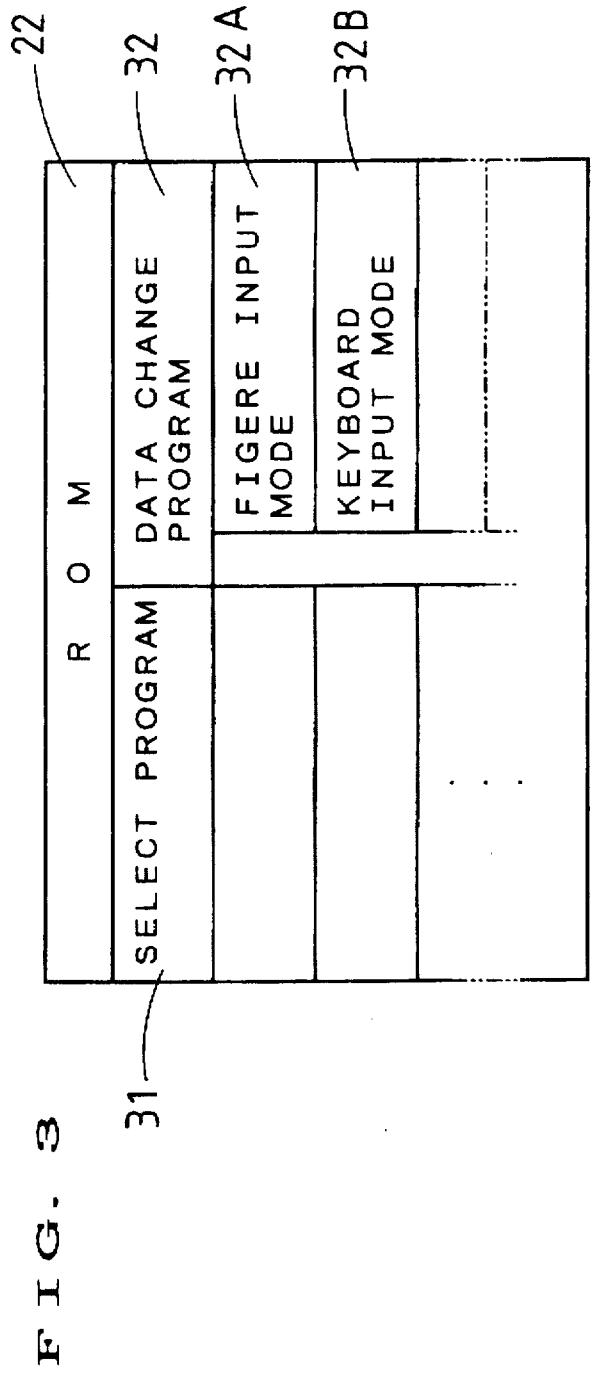
FIG. 3 is a schematic view showing various programs and data stored in ROM.

In the ROM 22, the select program 31, the data change program 32 and the other programs, the data which are necessary for operating the tape printer 1 are stored as shown in FIG. 3. The select program 31 selects one input mode from the data change program 32, based on the position of the plate 7 detected by the first position sensor 131 and the second position sensor 132. Further, figure input mode 32A, character input mode 32B and various input modes are stored in the data change program 32.

Figure 2B:
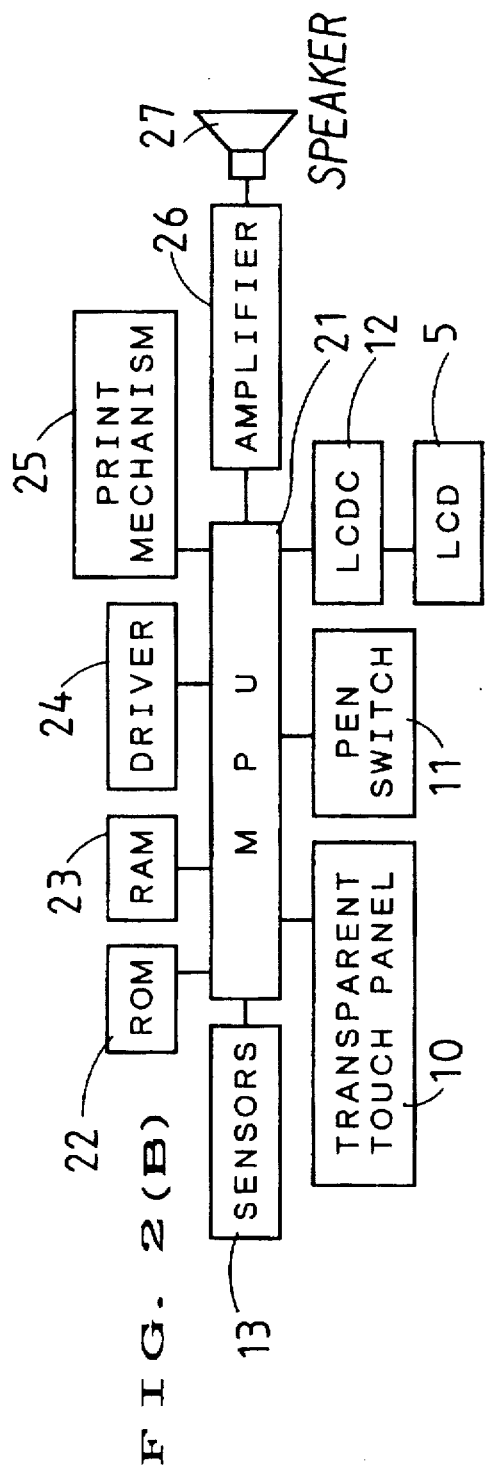

In FIG. 2B, various components except for the ROM 22 and the RAM 23 are connected to the MPU 21. The transparent touch panel 10 installed in the input part 3 is used for inputting coordinate data produced by depressing through the input pen 6, to the MPU 21. The pen switch 11 on the input pen 6 decides the coordinate data corresponding to the position depressed by the input pen 6, to output to the MPU 21. The sensors 13 have the first position sensor 131 and the second position sensor 132, both being arranged in the input part 3, and detect the position of the plate 7 as mentioned above.

The LCDC 12 is Liquid Crystal Display Controller which controls the liquid crystal display 5 so as to display the characters and figures input from the transparent touch panel 10 and the plate 7 thereon, based on the command data from the MPU 21. Further, the liquid crystal display 5 can display thereon the input mode selected from the data change program 32, in addition to the characters and the figures. The driver 24 controls the print mechanism 25 based on the command data from the MPU 21, so that the print mechanism 25 prints the characters and the figures displayed on the liquid crystal display 5. The amplifier 26 controls the speaker 27 based on the command data from the MPU 21 so that alarm or message is pronounced from the speaker 27.

Here, the input modes mainly set in the tape printer 1 will be described hereinafter. First, the figure input mode 32A will be explained. This figure input mode 32A is selected from the data change program 32 when the first position sensor 131 is ON and the second position sensor 132 is OFF. That is to say, the figure input mode 32A is selected when the plate 7 is slid into the main body 2. The input part 3 indicated in FIG. 6 is in a state that the figure input mode 32A is selected. In this state, the patterns of the common command area 19 on the touch panel 10 and the figure tool key sections 18 printed at the lower end of the plate 7 can be seen on the input part 3, as shown in FIG. 6. On the other hand, the character and symbol key sections 14 printed at the central position of the plate 7 and the function key sections 15 printed at the upper position thereof cannot be seen on the input part 3.

When the figure input mode 32A is selected, the figure input by using the touch panel 10, the common command input by using the common command area 19 and the figure tool input by using the figure tool key sections 18 can be done. The figure input is executed when the transparent touch panel 10 except for the common command area 19 and the figure tool key sections 16 of the plate 7 is depressed through the input pen 6. That is to say, when the touch panel 10 is depressed by the input pen 6 while the pen switch 11 is pressed, the position data corresponding to the position depressed by the input pen 6 is input as the coordinate data into the MPU 21. Then, the figure is described and input by moving the depressed position through the input pen 6 on the touch panel 10. Here, in case that an example sheet having the figures to be input thereon is set under the input part 3, the figure input can be easily done by moving the input pen 6 along the figures while looking the figures through the transparent touch panel 10.

When the pen switch 11 is clicked while retaining the input pen 6 in a depressed state on the common command area 19 of the transparent touch panel 10, the common command input is executed. In the common command input, the common command existing on the position depressed by the input pen 6 is input. For instance, when the input pen 6 depresses the print command 19A in the common command area 19, the print command is input.

When one of the figure tool key sections 16 printed at the lower end of the plate 7 in the touch panel 10 is depressed by the input pen 6, the figure tool input is done. Namely, if the pen switch 11 is clicked while depressing the touch panel 10 by the input pen 6, the figure tool existing the position depressed by the input pen 6 is input, thereby processing corresponding to the depressed figure tool is executed. For example, in case that the line width tool 16A is depressed by the input pen 6, processing for changing the line width is done.

The keyboard input mode 32B will be described hereinafter. This input mode 32A is selected when the first position sensor 131 is OFF and the second position sensor 132 is ON. In this case, the plate 7 is completely derived to the front position of the input part 3 from the main body 2, as shown in FIG. 7. At that time, the common command area 19 of the touch panel 10, the character and the symbol key sections 14 printed at the central position of the plate 7 and the function key sections 15 printed at the upper end of the plate 7 can be seen on the input part 3. On the other hand, the figure tool key sections 16 printed at the lower end of the plate 7 cannot be seen since such sections 16 are concealed by the front portion of the input part 3.

In the keyboard input mode 32B, the transparent touch panel 10 is substantially utilized as the keyboard, thus the character input, the function input or the common command input can be executed. That is to say, when the pen switch 11 is clicked while depressing the touch panel 10 by the input pen 6, the character input, the function input or the common command input is done in accordance with the position depressed by the input pen 6. Here, both in the figure input mode 32A and the keyboard input mode 32B, each common command in the common command area 19 can be used.

Figure 8:
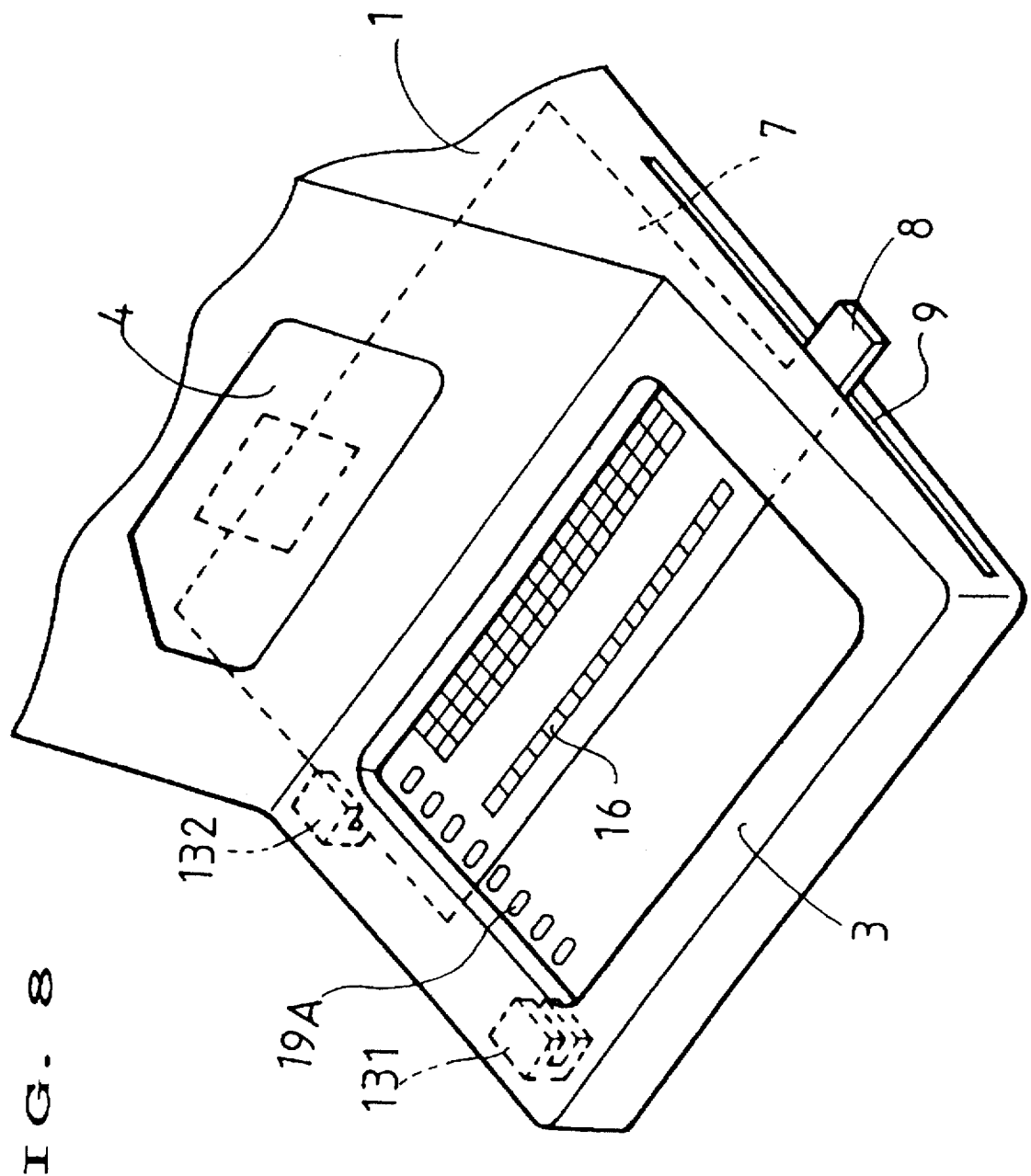
FIG. 8 is a perspective of the input part in which the keyboard plate is not properly set.

Further, as shown in FIG. 8, when the plate 7 is positioned on the halfway between the position where the figure input mode 32A is set (FIG. 6) and the position where the keyboard input mode 32B is set (FIG. 7), none of the figure input mode 32A and the keyboard input mode 32B is selected. In this case, the message "position of the plate 7 is incorrect" is displayed on the liquid crystal display 5, and all of the figure input, the character input and the function input cannot be executed.

Figure 4:
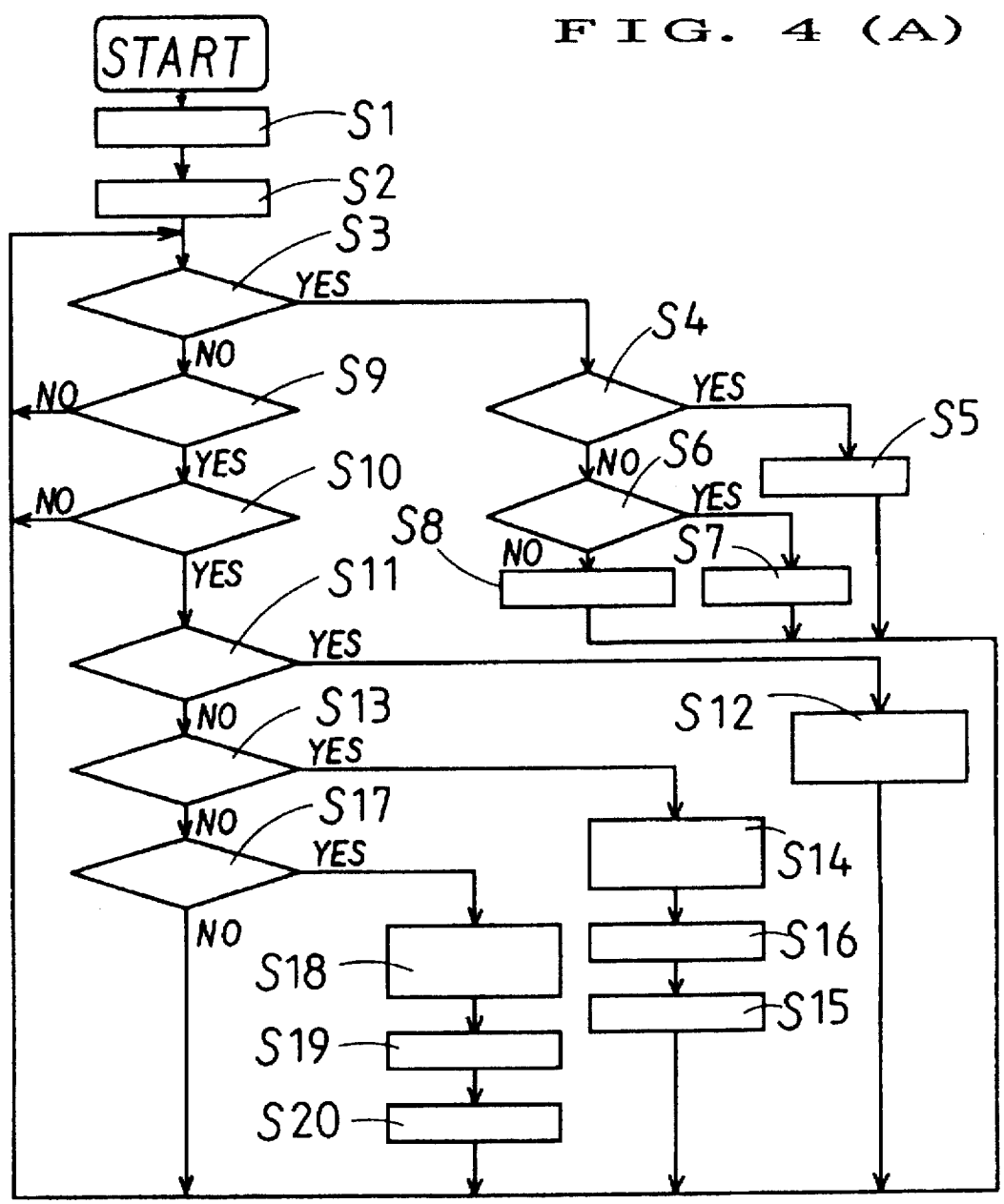
FIG. 4A is a flowchart to control the tape printer shown in FIG. 1.
FIG. 4B is a table for explaining operation in each step in the flowchart.

Next, operation of the tape printer 1 constructed according to the above will be described with reference to the flowchart shown in FIGS. 4A and 4B. First, power is turned on in step (abbreviated "S" hereinafter) 1, and thereafter initialization is conducted in S2. In S3, it is judged whether the position of the plate 7 is changed. If the position of the plate 7 is changed (S3: YES), process shifts to S4. In S4, it is judged whether the position after the plate 7 is slid corresponds to the position where the keyboard input mode 32B is selected, i.e., where the plate 7 is completely derived to the input part 3. This judgement is done based on whether the first position sensor 131 is in the OFF state or not.

If the first position sensor 131 is in the OFF state, it is judged that the plate 7 is slid to the position (FIG. 7) where the keyboard input can be done (S4: YES). Therefore, as the input mode, the keyboard input mode 32B is selected based on the signal from the first position sensor 131, and the liquid crystal display 5 is changed to a screen used for the keyboard input mode 32B (S5). Thereafter, process returns to S3.

If it is judged that the first position sensor 131 is in the ON state in S4 (S4:NO), process shifts to S6 since the plate 7 does not exist at the position where the keyboard input can be done. In S6, it is judged whether the position after the plate 7 is slid corresponds to the position where the figure input mode is selected, i.e., where the plate 7 is slid into the main body 2. This judgement is done based on whether the second position sensor 132 is in the OFF state or not. If the second position sensor 132 is in the OFF state, it is judged that the plate 7 is slid to the position (FIG. 6) where the figure input can be done (S6:YES). Therefore, as the input mode, the figure input mode 32A is selected based on the signal from the second position sensor 132, and the liquid crystal display 5 is changed to a screen used for the figure input mode 32A (S7). Thereafter, process returns to S3.

In S6, if the second position sensor 132 is in the ON state, it is judged that the plate 7 is not yet positioned at the figure input position (S6:NO). Therefore, in this case, it is concluded that the plate 7 is positioned at none of the keyboard input position and the figure input position, thus the plate 7 is positioned on the halfway between the keyboard input position and the figure input position, as shown in FIG. 8. Therefore, the message "position of the plate 7 is incorrect" is displayed on the liquid crystal display 5 in S8. As a result, the operator can recognize that all of the figure input, the character input and the function input cannot be executed. Thereafter, process returns to S3.

In S3, if the position of the plate 7 is not changed (S3:NO), process shifts to S9. In S9, it is judged whether the plate 7 is positioned at the correct position or not. And in case that the plate 7 is positioned at one of the keyboard input position and the figure input position, it is judged that the plate 7 is positioned at the correct position. Contrarily, in case that the plate 7 is on the halfway to one of the keyboard input position and the figure input position, it is judged that the plate 7 is not positioned at the correct position. Such judgement is done based on combinations of ON state and OFF state in both the first position sensor 131 and the second position sensor 132. If the plate 7 is not positioned at the correct position (S9:NO), process returns to S3. On the other hand, if the plate 7 is positioned at the correct position (S9:YES), it is judged whether data input is conducted by the input pen 6 or not in S10. If data input by the input pen 6 is not conducted (S10:NO), process returns to S3.

If any data input is conducted by the input pen 6 (S10:YES), it is judged in S11 whether such data input is the common command input. At that time, in case that the position depressed by the input pen 6 is in the common command area 19 on the transparent touch panel 10, it is judged "YES" in S11. If the depressed position is in the common command area 19, i.e., it is judged that the common command input is done (S11:YES), process shifts to S12. In S12, command process such as print process or the like according to the input common command is executed. After the command process is executed, process returns to S3.

In S11, if judged that the common command input is not done (S11:NO), process of the input data to be executed is made different with each other corresponding to what input mode is selected. Thus, it is necessary to judge the selected input mode based on the position of the plate 7.

Therefore, it is judged in S13 whether the plate 7 is positioned at the keyboard input position or not. This judgement is done based on whether the first position sensor 131 is in the OFF state, similar to the judgement in S4. If the plate 7 is positioned at the keyboard input position shown in FIG. 7 (S13:YES), the input mode is the keyboard input mode 32B. Thus, the data input from the input pen 6 is character data or function data. Accordingly, the character or the function corresponding to the depressed position on the transparent touch panel 10 is selected (S14). At that time, if necessary, process for converting Japanese character "KANA" to Chinese character "KANJI" is conducted. Further, the selected character is stored in RAM 23 in S15 and is displayed on the liquid crystal display 5 in S16. Thereafter, process returns to S3.

In S13, if judged that the plate 7 is not positioned at the keyboard input position (S13:NO), it is judged in S17 whether the plate 7 is positioned at the figure input position. This judgement is done based on whether the second position sensor 132 is in the OFF state, similar to the judgement in S6. If the plate 7 is positioned at the figure input position as shown in FIG. 6 (S17:YES), the input mode is the figure input mode 32A. Thus, the data input from the input pen 6 is the figure processing data, that is, the figure writing data or the figure tool command data. Therefore, in S18, the figure processing corresponding to the figure writing data or the figure tool command data is executed based on the position depressed on the touch panel 10. Further, the processed figure data is stored in RAM 23 in S19 and the figure is displayed on the liquid crystal display 5 in S20. Thereafter, process returns to S3.

In case that the plate 7 is not positioned at the figure input position (S17:NO), the plate 7 is positioned on halfway between the character input position and the figure input position as shown in FIG. 8. Therefore, the input mode is set none of the figure input mode 32A and the keyboard input mode 32B. As a result, the data input from the input pen 6 is made invalid, and process returns to S3.

The process mentioned above is the operation executed in the tape printer 1. As described above, every the operator inputs on the transparent touch panel 10 through the input pen 6 and the pen switch 11 while moving the plate 7 to both the forward and the backward directions by the operation stick 8, the input mode is judged according the flowchart mentioned above and the data corresponding to the depressed position is input.

As detailedly explained, in the tape printer 1 of the embodiment, the plate 7 is movably arranged in the input part 3 including the transparent touch panel 10 between the forward and the backward directions and the position of the plate 7 is detected by cooperation of the first position sensor 131 and second position sensor 132, both being arranged in the input part 3. Thereby, every the data is input by the input pen 8 and the pen switch 11, the input mode is judged based on the position of the plate 7, and further the input data is converted to processing data according to the input mode, thereafter the process of the converted data is executed. Therefore, the operator can desirably input the data while selecting the input mode by moving the plate 7 through the operation stick 8. As a result, various data input can be easily conducted by rapidly changing the handwriting input mode and the keyboard input mode. Accordingly, it can be realized a convenient compact electronic device with easy operation without installing a keyboard independently from a touch panel input device.

While the invention has been particularly shown and described with reference to preferred embodiments thereof, it will be understood by those skilled in the art that the foregoing and other changes in form and details can be made therein without departing from the spirit and scope of the invention.

For instance, in the embodiment, since the data input cannot be executed at all when the plate 7 is positioned on halfway to the keyboard input position or the figure input position as shown in FIG. 8, it may be conceivable that each of the common commands in the common command area 19 can be used.

Further, in the embodiment, since only one plate 7 is arranged in the input part 3, it may be conceivable that a plurality of plates 7 with different kinds are arranged in the input part 3. In this case, the position of switch mark 17 is slightly deviated in each of the plate 7 and the position of the plate 7 and the kind of the plate 7 are detected by a plurality of the first and the second position sensors 131, 132 arranged according the number of the switch mark 17.

What is claimed is:

1. A compact data input device having a transparent touch panel outputting positional data in accordance with a position depressed by an input pen on a figure input area of the transparent touch panel and a plurality of data change programs including at least a figure input program and a keyboard input program, the positional data output from the transparent touch panel being changed into character data or figure data based on the data change programs, the data input device comprising:

an input plate with a keyboard pattern thereon, the input plate being movably arranged under the transparent touch panel;

detection means for detecting a first position where the input plate is positioned under the transparent touch panel and a second position where the input plate is positioned substantially out of the transparent touch panel; and selection means for selecting one of the data change programs based on the first position or the second position detected by the detection means;

wherein the selection means selects the keyboard input program when the first position is detected by the detection means and selects the figure input program when the second position is detected by the detection means, and wherein a figure input is conducted through the figure input area formed on the transparent touch panel when the figure input program is selected by the selection means and the keyboard pattern of the input plate is arranged below the figure input area of the transparent touch panel and a keyboard input is conducted through the keyboard pattern when the keyboard input program is selected by the selection means.

2. The compact data input device according to claim 1, wherein the data input device is constructed from a main body with a display part on a front face thereof and an input part in which the transparent touch panel is accommodated.

3. The compact data input device according to claim 2, wherein a liquid crystal display on which the character data and the figure data are displayed is arranged on the display part.

4. The compact data input device according to claim 1, wherein a pen switch is arranged on the input pen, the pen switch being used for deciding the positional data output from the transparent touch panel.

5. The compact data input device according to claim 1, wherein a common command area including a print command is printed on the transparent touch panel.

6. The compact data input device according to claim 2, wherein a slot for inserting the input plate is formed on a side face of the input part.

7. The compact data input device according to claim 6, wherein the input plate has an operation portion at one side thereof and the operation portion is exposed out of the slot, thereby the operation portion is made operable out of the input part.

8. The compact data input device according to claim 2, wherein a transparent plate to protect the transparent touch panel is arranged between the transparent touch panel and the input plate in the input part.

9. The compact data input device according to claim 8, wherein the transparent plate is made of glass.

10. The compact data input device according to claim 5, wherein the keyboard pattern includes character and symbol key sections, function key sections and figure tool key sections.

11. The compact data input device according to claim 10, wherein a blank section is formed on the input plate so that the character and symbol key sections, the function key sections and the figure tool key sections are not superposed with the common command area on the transparent touch panel.

12. The compact data input device according to claim 11, wherein a detection section is formed near the blank section and a switch mark which is detected by the detection means is formed on the detection section.

13. The compact data input device according to claim 12, wherein the detection means has a couple of photosensors which detect both the first and the second positions in cooperation with each other based on whether light in the photo sensors is intercepted by the switch mark.

14. The compact data input device according to claim 13, wherein both the first position and the second position are detected based on combinations of ON state and OFF state in the photo sensors.

15. The compact data input device according to claim 1, wherein the data change programs are comprised data input mode setting programs.

16. The compact data input device according to claim 10, wherein the transparent touch panel, the common command area thereon and the figure tool key sections on the input plate are utilizable under control by the figure input program.

17. The compact data input device according to claim 10, wherein the character and symbol key sections, the function key sections, the figure tool key sections on the input plate and the common command area on the transparent touch panel are utilizable under control by the keyboard input program.

18. The compact data input device according to claim 3, further comprising judgement means that the input plate exists on halfway to both the first and the second positions when the detection means fails to detect both the first and the second positions.

19. The compact date input device according to claim 18, further comprising display control means for controlling the liquid crystal display to display a message thereon when it is judged by the judgement means that the input plate exists on halfway to both the first and the second positions.

20. The compact data input device according to claim 18, further comprising prohibition means for prohibiting data input when it is judged by the judgement means that the input plate exists on halfway to both the first and the second positions.

21. A tape printer having a transparent touch panel outputting positional data in accordance with a position depressed by an input pen on a figure input area of the transparent touch panel and a plurality of data change programs including at least a figure input program and a keyboard input program, the positional data output from the transparent touch panel being changed into character data or figure data based on the data change programs, the data input device comprising:

display means for displaying the character data and the figure data thereon;

print means for printing on a tape the character data and the figure data displayed on the display means;

control means for controlling both the display means and the print means;

an input plate with a keyboard pattern thereon, the input plate being movably arranged under the transparent touch panel;

detection means for detecting a first position where the input plate is positioned under the transparent touch panel and a second position where the input plate is positioned substantially out of the transparent touch panel; and selection means for selecting one of the data change programs based on the first position or the second position detected by the detection means;

wherein the selection means selects the keyboard input program when the first position is detected by the detection means and selects the figure input program when the second position is detected by the detection means, wherein a figure input is conducted through the figure input area formed on the transparent touch panel when the figure input program is selected by the selection means and the keyboard pattern of the input plate is arranged below the figure input area of the transparent touch panel and a keyboard input is conducted through the keyboard pattern when the keyboard input program is selected by the selection means, and wherein the control means controls both the display means and the print means so that the character data is displayed and printed under control by the keyboard input program and so that the figure is displayed and printed under control by the figure input program.

* * * * *